(12) United States Patent
Ives et al.

(10) Patent No.: US 6,567,266 B2
(45) Date of Patent: May 20, 2003

(54) FOAM SYSTEMS FOR PROTECTING DISK DRIVES FROM MECHANICAL DISTURBANCES

(75) Inventors: Thomas W Ives, Boise, ID (US); Donald P Roehling, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 80 days.

(21) Appl. No.: 09/859,850

(22) Filed: May 16, 2001

(65) Prior Publication Data

US 2002/0172004 A1 Nov. 21, 2002

(51) Int. Cl.[7] .................................................. G06F 1/16
(52) U.S. Cl. ........................ 361/685; 361/679; 361/683
(58) Field of Search ........................ 361/679, 683–686

(56) References Cited

U.S. PATENT DOCUMENTS 5,058,745 A * 10/1991 Warner et al. .............. 206/523
5,680,295 A * 10/1997 Le et al. .................... 361/695
6,018,456 A * 1/2000 Young et al. ............... 361/684
6,134,113 A * 10/2000 Mills et al. ................. 361/725

FOREIGN PATENT DOCUMENTS

| DE | 19812479 | 6/1999 |
| DE | 29905846 U | 6/1999 |
| EP | 0 845 782 | 6/1998 |
| EP | 2 353 628 | 2/2001 |
| JP | 2001-148186 | 5/2001 |
| JP | 2002-093139 | 3/2002 |

* cited by examiner

Primary Examiner—Darren Schuberg
Assistant Examiner—Yean-Hsi Chang

(57) ABSTRACT

A disk drive array can be protected from mechanical disturbances by foam positioned between a disk drive/mounting cage assembly and an enclosure system. In some of the more preferred embodiments of this invention the individual disk drives will be rigidly mounted to their mounting cage.

20 Claims, 9 Drawing Sheets

FOAM SYSTEMS FOR PROTECTING DISK DRIVES FROM MECHANICAL DISTURBANCES

BACKGROUND OF THE INVENTION

1. Technical Field

The present invention generally relates to protection of disk drives such as a Redundant Array of Independent Disks ("RAID") storage system from external and/or internal mechanical disturbances. The present invention especially relates to the use of viscoelastic foam materials to protect arrays of disk drives from such disturbances. It is of course well known that foams can provide a wide variety of damping and compliance characteristics. These characteristics generally follow from the fact that foams contain long-chain molecules that are capable of converting mechanical energy into heat when the foam is deformed.

2. Description of Related Art

Since RAID storage systems are one of the most important forms of disk drive arrays, they will be used to illustrate and differentiate applicant's invention. Generally speaking, RAID storage systems are arrays of disk drives ("DDs") controlled by one or more controllers. Higher data transfer rates are achieved through the ability of the system's controller to schedule, read and write commands to multiple DDs in a parallel fashion. Such storage systems employ one or more motor driven spindles that rotate the DDs at several thousand revolutions per minute. Such systems also have a printed circuit board that receives commands from the controller and translates them into voltage fluctuations that cause a head actuator to move an array of ganged read/write heads across a complimentary array of disks. The head actuator must push and pull each gang with the extreme precision required to properly position a given head with select tracks that lie in concentric circles on the surface of a disk being served by that head. In short, disk drive systems are very precise, and very delicate, pieces of equipment that must be protected from mechanical shocks and vibrations—from whatever source.

Therefore, owing to their mechanical sensitivities, these systems are shipped to their end users in external packaging systems that include extra and/or specifically designed, and hence expensive, foam padding systems. Those skilled in the disk drive arts also will appreciate that a RAID system's DDs are especially susceptible to external mechanical disturbances. Consequently, these DDs are shipped separately from the rest of the RAID system. The individual DDs are usually placed in compartmentalized, foam-lined, boxes and static electricity resistance bags. Aside from its greater packaging and shipping costs, this practice also adds a great deal to the setup time when a RAID system is unpacked and installed.

Aside from carefully packing their products for shipping in external foam padding systems, RAID system manufacturers also have provided compliant mounting systems for individual DDs in order to protect them from external mechanical disturbances during use of the RAID system. For example, some manufacturers have followed the practice of placing a complaint medium between each DD and the enclosure cage to which the individual DDs are mounted. These DDs are mounted to their enclosure cage in this compliant manner in order to filter potentially harmful external mechanical disturbances. Unfortunately, a RAID's throughput performance can be diminished as a result of this type of compliant mounting of individual DDs to their DD enclosure cage. That is to say that, under the compliant mounting conditions between the individual DDs and the DD enclosure cage, the DDs may exhibit diminished throughput performance due to certain self-induced vibrations which the compliant mountings permit to occur. For example, under these compliant mounting conditions, servomechanism movements of individual DDs can cause rotational vibration disturbances that can cause one or more DDs in a DD array to become self-disturbed or self-excited. It is also possible for DDs to be adversely affected by translational forces from external sources after they are placed in operation.

It therefore would be very advantageous to (1) protect arrays of disk drives such as those employed in RAID systems from external mechanical disturbances during shipping, (2) ship such systems with their DDs preinstalled in order to decrease installation costs and (3) protect such systems from internal and external vibrations and/or mechanical shock during operation. Accomplishing these ends by use of a single, permanently installed, mechanical means is a particularly desirable circumstance. Applicant has found that these advantages can be obtained through at least two distinct means: employment of foams in certain mechanical disturbance damping systems hereinafter more fully described, and/or by mounting disk drives to their enclosure cage in as rigid a fashion as possible.

SUMMARY OF THE INVENTION

Applicant has found that external mechanical disturbances to disk drive arrays, and especially hard disk drive arrays (e.g., RAID systems employing arrays of hard disk drives), during shipping, installation and use, as well as self-excitation of such disk drives ("DDs") as a result of their operation, all can be filtered or attenuated by the hereindescribed foam systems. These foam systems also may allow such DDs to be shipped preinstalled, thereby eliminating the current need for extensive, and hence costly, unpacking and installation operations.

To achieve these ends, applicant provides a disk drive enclosure system, comprising: an enclosure, a cage configured to mount a plurality of disk drives and foam between the cage and the enclosure. Generally speaking a plurality of disk drives are mounted to the cage. Thus, applicant's disk drive enclosure system has a viscoelastic foam on at least one outside surface of a DD array and/or an enclosure cage to which that DD array is mounted. For the purposes of this patent disclosure, this combination of a DD array and an enclosure cage to which the array is mounted will often be referred to as a "DD/enclosure cage assembly". This DD/enclosure cage assembly can be provided with one or more layers of foam at various places on that assembly. The resulting DD/enclosure cage assembly/foam system is then placed inside an enclosure which, in turn, is mounted in an external housing.

In some embodiments of this invention, the foam is placed in a state of compression between the DD/enclosure cage assembly and the enclosure. This compressed state can follow from the fact that a given piece of foam, in its uncompressed state, is thicker than the space into which it is inserted. Upon being compression fitted into the space between the enclosure and the DD/enclosure cage assembly, the foam naturally presses outwardly against both the enclosure and the enclosure cage assembly. Thus, the foam materials used in the practice of this embodiment are preferably resilient as well as compressible.

In some of the more preferred embodiments of this invention, the DDs also will be rigidly mounted to the DD enclosure cage. For the purposes of this patent disclosure, applicant's use of the expression "rigidly mounted" can be taken to mean that no foam or other compliant material is placed between the individual DDs and the DD enclosure cage, e.g., as they are in the prior art DD mounting practice previously noted. That is to say that under applicant's rigid mounting conditions, a plastic (or metal) housing of an individual DD will normally be pressed directly against a metal (or plastic) enclosure cage element. The resulting rigid mounting raises the effective inertia of the entire DD array— and thereby reducing its self excited dynamic responses. This rigid mounting practice also serves to reduce the natural frequency of applicant's DD arrays. The resulting lower frequencies will serve to attenuate higher, more harmful, frequencies (which include shock) that may be directed toward the DD array. In other words, very little force and/or torsion will be transmitted to the DDs when applicant's DD/enclosure cage assembly is provided with a low natural frequency by rigidly mounting the DDs to the enclosure cage.

DETAILED DESCRIPTION OF THE INVENTION

Figure 1:
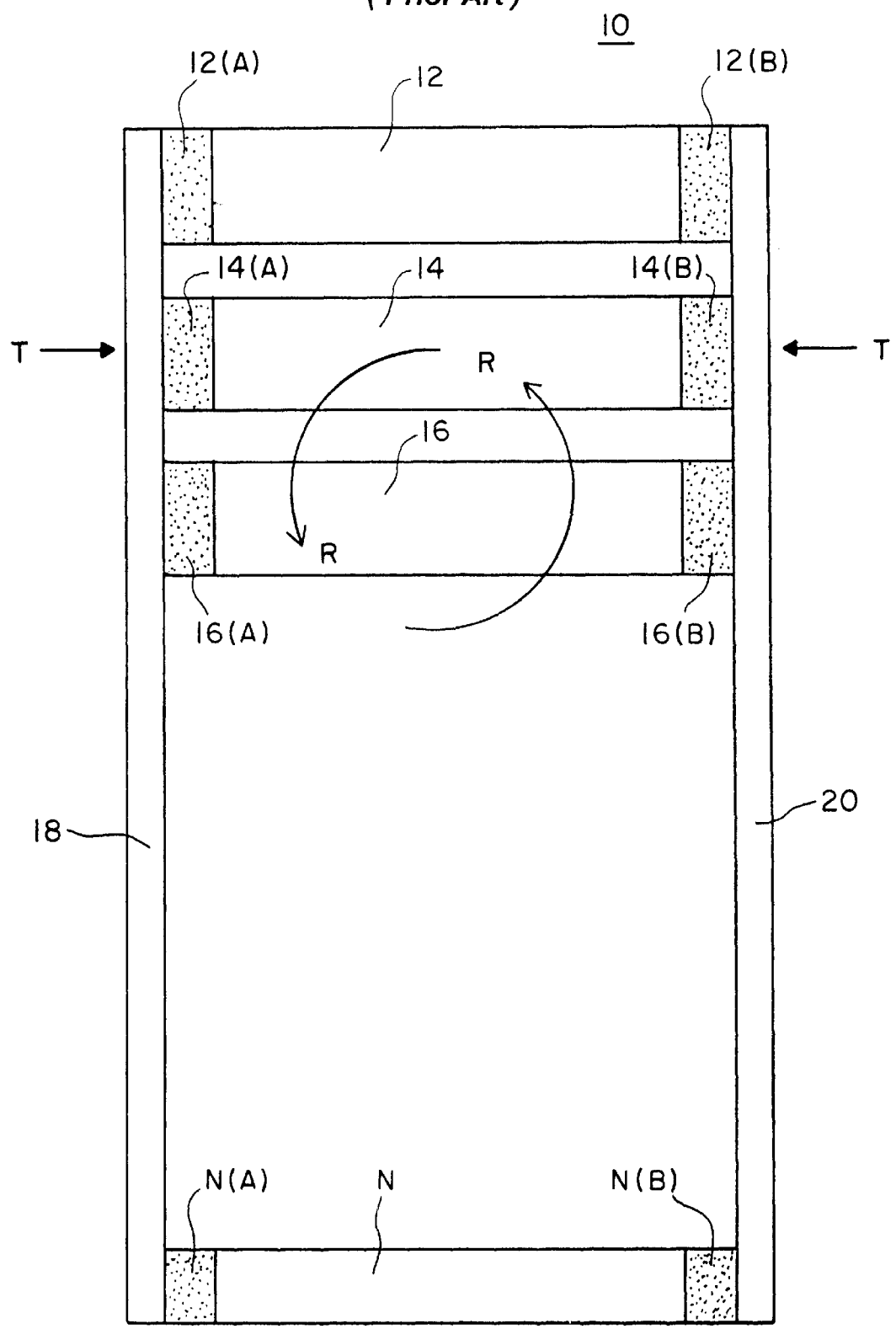
FIG. 1 shows a prior art method of mounting individual DDs to a DD enclosure cage.

FIG. 1 depicts a plurality or array of DDs 12, 14, 16 . . . N of a disk drive system such as a RAID system. Again, since RAID storage systems are one of the most important forms of disk drive arrays, they will be used to illustrate applicant's invention. Those skilled in this art will however appreciate that other kinds of disk drive arrays can be protected by the practice of this invention. In any case, FIG. 1 shows a RAID system mounted between two mounting cage elements 18 and 20. This mounting is according to a prior art mounting device (the mounting and/or fastener devices used therein are not shown) in which each individual DD is mounted compliantly on each of its ends. For example, DD 12 is shown compliantly mounted through use of a layer of compliant material 12(A) on its left end and compliantly mounted through use of a layer of complaint material 12(B) on its right end. Similar mountings are shown on DDs 14, 16 . . . N. Again, these prior art mounting devices serve to filter harmful external mechanical disturbances (e.g., translational forces T) from the DDs. They are not, however, effective devices for damping self-induced DD vibrations. Again, this is not the best of circumstances because self-induced DD vibrations are capable of lowering the throughput performance of disk drive arrays in general, and RAID systems in particular.

Figure 2:
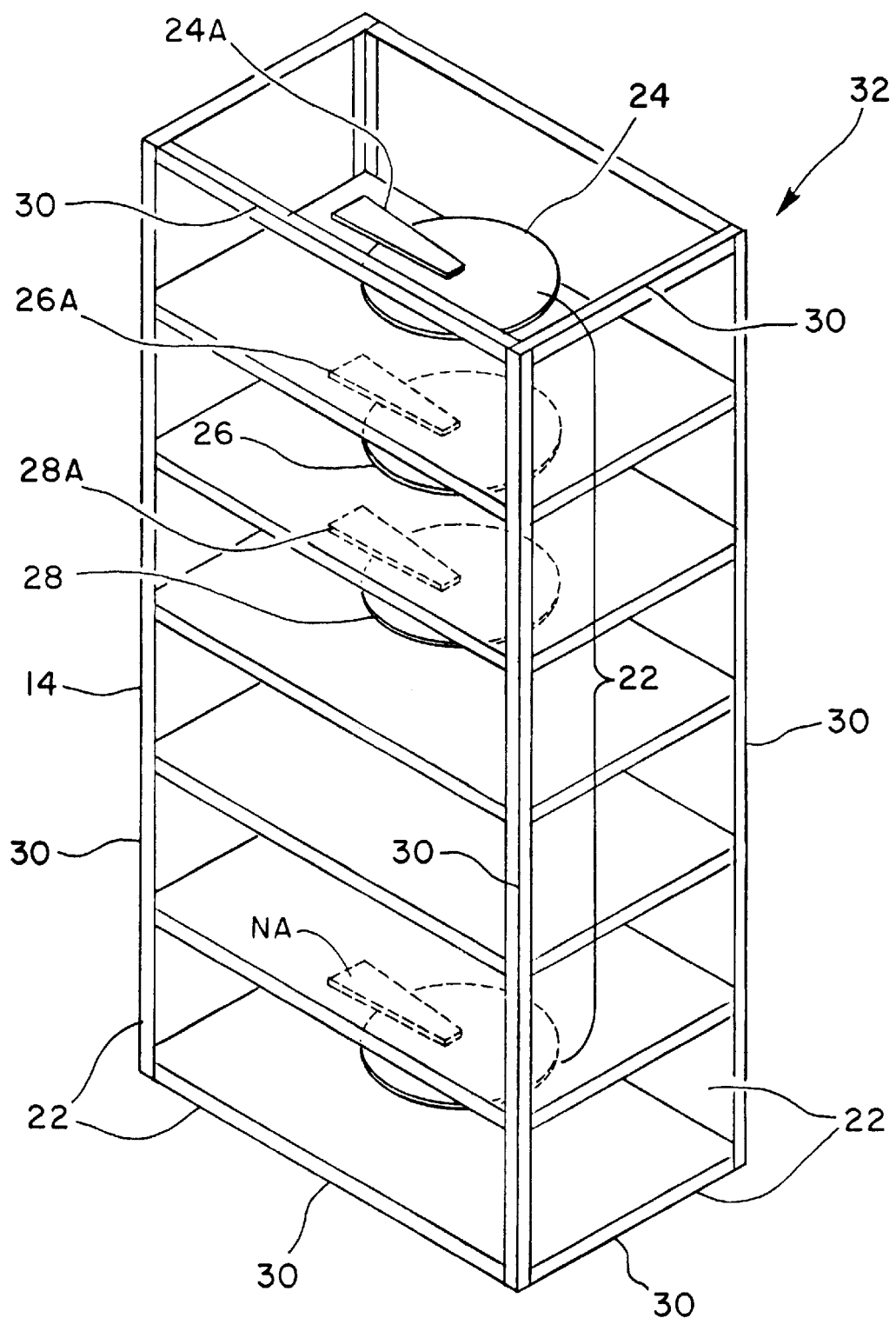
FIG. 2 shows a DD array to be protected by the methods of the present invention attached to an mounting cage and thereby creating a DD/mounting cage assembly.

FIG. 2 depicts another array 22 of DDs 24, 26, 28 . . . N each of which is associated with at least one ganged arm (e.g., arm 24A, arm 26A, arm 28A, etc.) that carries a read/write head (not shown) over the surface of a given disk in ways well known to this art. The DD array 22 is shown mounted to a DD mounting cage 30 and thereby creating a DD/mounting cage assembly 32. Thus, the mounting cage 30 is the means by which the individual DDs 24, 26, 28 . . . N of the DD array 22 are mounted in space with respect to each other. In FIG. 2, layers of compliant material, such as those shown in FIG. 1, are not shown positioned between the individual DDs and the mounting cage 30. This circumstance is intended to suggest that the DDs will be mounted as rigidly as possible to the mounting cage 30. That is to say that there will be no intentional compliant mounting between the individual DD units and the mounting cage 30 as there is in the prior art mounting method depicted in FIG. 1. Applicant's rigid mounting of the individual DDs to the mounting cage 30 may be means of a variety of fastener, connector or locking devices that are well known to those skilled in this art, but deleted from these drawings for the sake of visual clarity.

By rigidly mounting the individual DDs 24, 26, 28, etc. to the mounting cage 30, the sum total of self excitations per unit of mass of the overall DD/mounting cage assembly 32 will be reduced for at least three possible reasons. First, combined random excitations will reduce excitation per individual DD. Second, the additional mass of the rigid DD/mounting cage assembly 32 raises the inertia of that assembly and thus further reduces an individual DD's dynamic responses to self excitations. Third, any combined random excitations will tend to reduce overall excitation per unit of inertia of the DD/mounting cage assembly 32. Owing to these inertia considerations, the mounting cage 30 of the DD/mounting cage assembly 32 preferably will be made of a metal such as steel (as opposed to a relatively lighter material such as plastic). It also is possible for self excitations among such an array of DDs to synchronize. To guard against this possibility, applicant may mount half of the DDs in an "upside down" fashion. This mounting arrangement tends to cancel synchronized self excitations.

Figure 3:
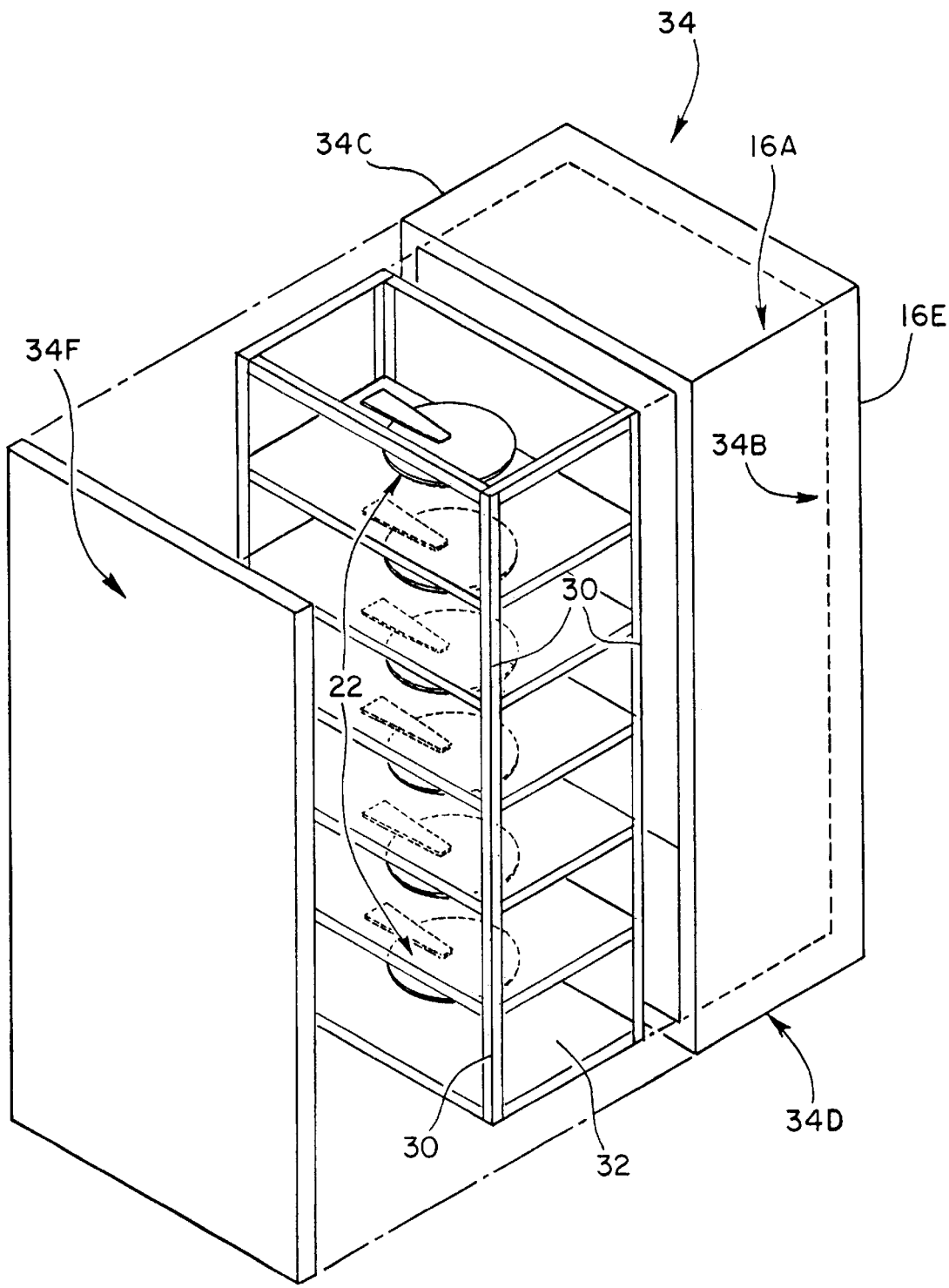
FIG. 3 shows the DD/mounting cage assembly shown in FIG. 2 being placed inside a foam system to create a DD/mounting cage/foam system.

FIG. 3 shows the DD/mounting cage assembly 32 of FIG. 2 being placed in a foam system 34. This foam system 34 may have top, side, bottom and rear components that are unified with each other to form a box-like foam structure such that shown in FIG. 3. In the alternative, the foam system 34 may be comprised of physically separate and distinct foam components such as those shown in FIGS. 8 and 9. In any case, FIG. 3 depicts a box-like, foam system 34 having a top 34A, a right side 34B, a left side 34C, a bottom 34D and a rear 34E that constitute one unified body by virtue of the foam having been molded in this box-like configuration. Such a box-like structure will have ports (not shown) for electrical wiring (not shown) to connect the DDs to other electrical components of the RAID system and adequate openings for airflow. The front face of the foam layer system 34 is shown being provided with a front piece 34F that, in effect, serves as a "lid" to the six sided, box-like foam system 34. Thus, the DD/mounting cage assembly 32 shown in FIG. 3 can be though of as about to be inserted into and completely surrounded by the foam system 34. The result of placing the DD/mounting cage assembly 32 in such a foam system 34 is an assembly that applicant will often refer to as a "DD/mounting cage/foam system".

The compliance and dampening characteristics of the foam used to make such a foam system 34 can be modified by various mechanical means. For example, these characteristics can be modified simply by varying a foam's thickness. Thus, a thicker piece of foam placed in a given space between a DD/mounting cage assembly 32 and an enclosure system 36 could result in compression (or greater compression) of the foam in a given location. Such a foam system 34 also can be modified mechanically through use of layers of different types of foam and/or placement of such different types of foam at different positions in the foam system 34.

Some foams may, for example, have the desired amount of damping, but not the desired amount of compliance. Other foams may have the desired amount of compliance, but the wrong amount of damping. By layering different kinds of foam, optimal damping and compliance characteristics for an overall two ply foam system such as that shown in FIG. 6 can be achieved. Thus, two or more layers of different types of commercially available foam can be employed to obtain specifically desired damping and compliance characteristics—without having to design and make specific foams having various desired damping and compliance characteristics. These foams also can be "tuned" by changing their chemical compositions. More will be said about this in subsequent parts of this patent disclosure.

Figure 4:
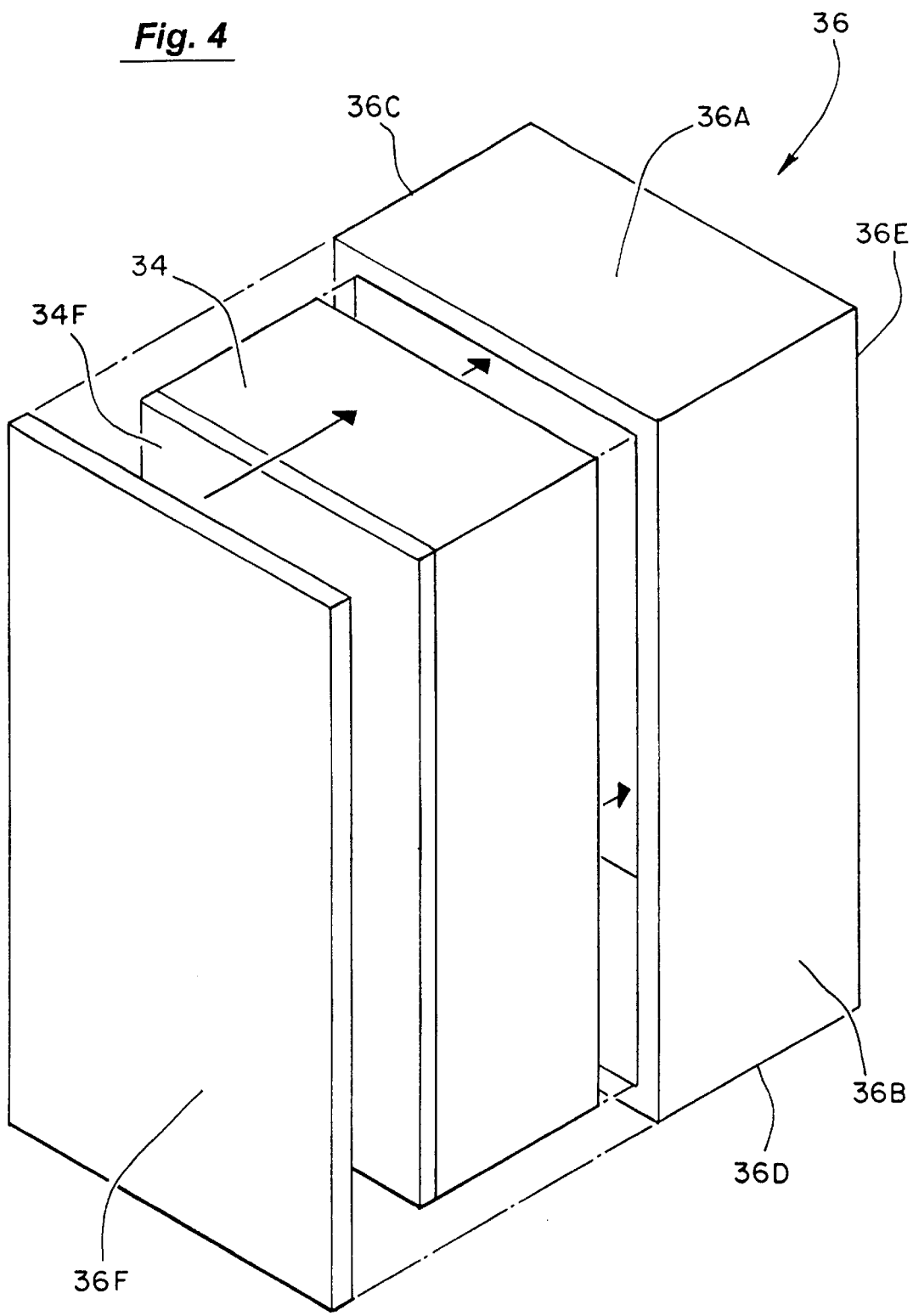
FIG. 4 shows the DD/mounting cage/foam system of FIG. 3 being placed in an enclosure to create a DD/mounting cage/foam enclosure system.

FIG. 4 shows the foam system 34 (and the DD/mounting cage assembly 32 contained in it, as shown in FIG. 3) being mounted inside an enclosure 36. Thus, the rectangular solid-configured foam system 34 shown in FIG. 4 resides between the DD/mounting cage assembly 32 and the enclosure 36. The enclosure 36 is shown having a comparable box-like configuration. This box-like configuration is not, however, a requirement for the enclosure 36. Any given side, or sides, of the enclosure 36 may be missing from the depiction shown in FIG. 4. In some more preferred embodiments of this invention, however, the enclosure 36 will have at least four sides. In other preferred embodiments, a DD/mounting cage assembly 32 having a rectangular, solid or box-like configuration, will reside in a six sided enclosure 36 and have a layer of foam on all six of its sides. Moreover, one or more of these six layers of foam can be in a state of compression between the DD/mounting cage assembly 32 and the enclosure 36. In one particularly preferred embodiment of this invention, all six sides of a DD/mounting cage assembly 32 will be in contact with a foam layer that is in a state of compression.

Figure 5:
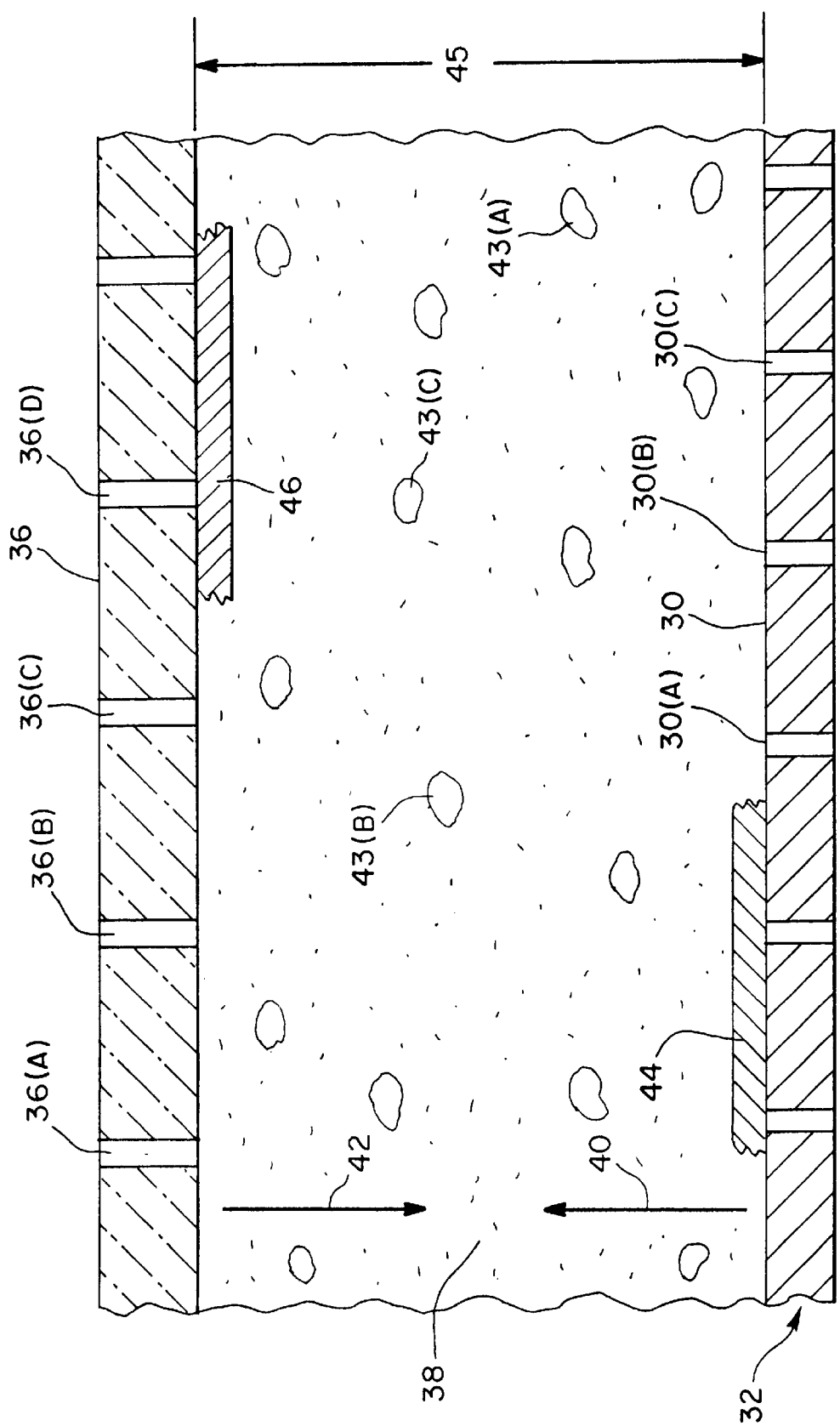
FIG. 5 shows a cross sectional detail of a DD/mounting cage/foam/enclosure system.

FIG. 5 shows a layer of foam 38 placed between a cage element 30 of a DD/mounting cage assembly 32 and an enclosure system 36 element. Direction arrows 40 and 42 are intended to suggest that the foam layer 38 could be (but need not be) in a state of compression between the DD/mounting cage assembly 32 and the enclosure 36. FIG. 5 also shows how the layer of foam 38 and/or the DD/mounting cage assembly 32 may be provided with a layer of adhesive material 44. Such a layer of adhesive may be used to position the foam 38 with respect to the DD/mounting cage assembly 32—especially in those circumstances where the foam layer 38 is not placed in a state of compression between the DD/mounting cage assembly 32 and the enclosure 36. Likewise, the foam layer 38 and/or enclosure 36 may be provided with a comparable layer of adhesive 46 to aid in positioning the foam layer 38 with respect to the enclosure 36. Suitable adhesives for applicant's foam placement purposes would include high-modulus adhesives such as acrylic adhesives or epoxy adhesives.

FIG. 5 also illustrates use of foam materials that have an array of void spaces 43(A), 43(B), 43(C), etc. distributed throughout the body of the foam material. Foam materials having such void spaces distributed throughout their bodies are well known to the foam manufacturing arts. By way of example only, U.S. Pat. Nos. 5,587,231 ("the '231 patent"); U.S. Pat. No. 5,888,642 ("the '642 patent") and U.S. Pat. No. 3,640,787 ("the '787 patent") teach foams having an array of such void spaces. These void spaces can be designed into a foam by the use of various chemical ingredients, and/or relative proportions thereof, in order to vary a foam's mechanical compliance damping characteristics. Such void spaces also give a foam the quality of air porosity or so-called "breathability". This breathability enables air to more easily pass through the foam. It also should be noted in passing that the thickness 45 of the foam layer(s) used in the practice of this invention can vary depending upon a number of factors such as the size of the space between the DD/mounting cage assembly 32 and the enclosure 36, the type of foam material selected and the size and distribution of void spaces within that foam.

Figure 6:
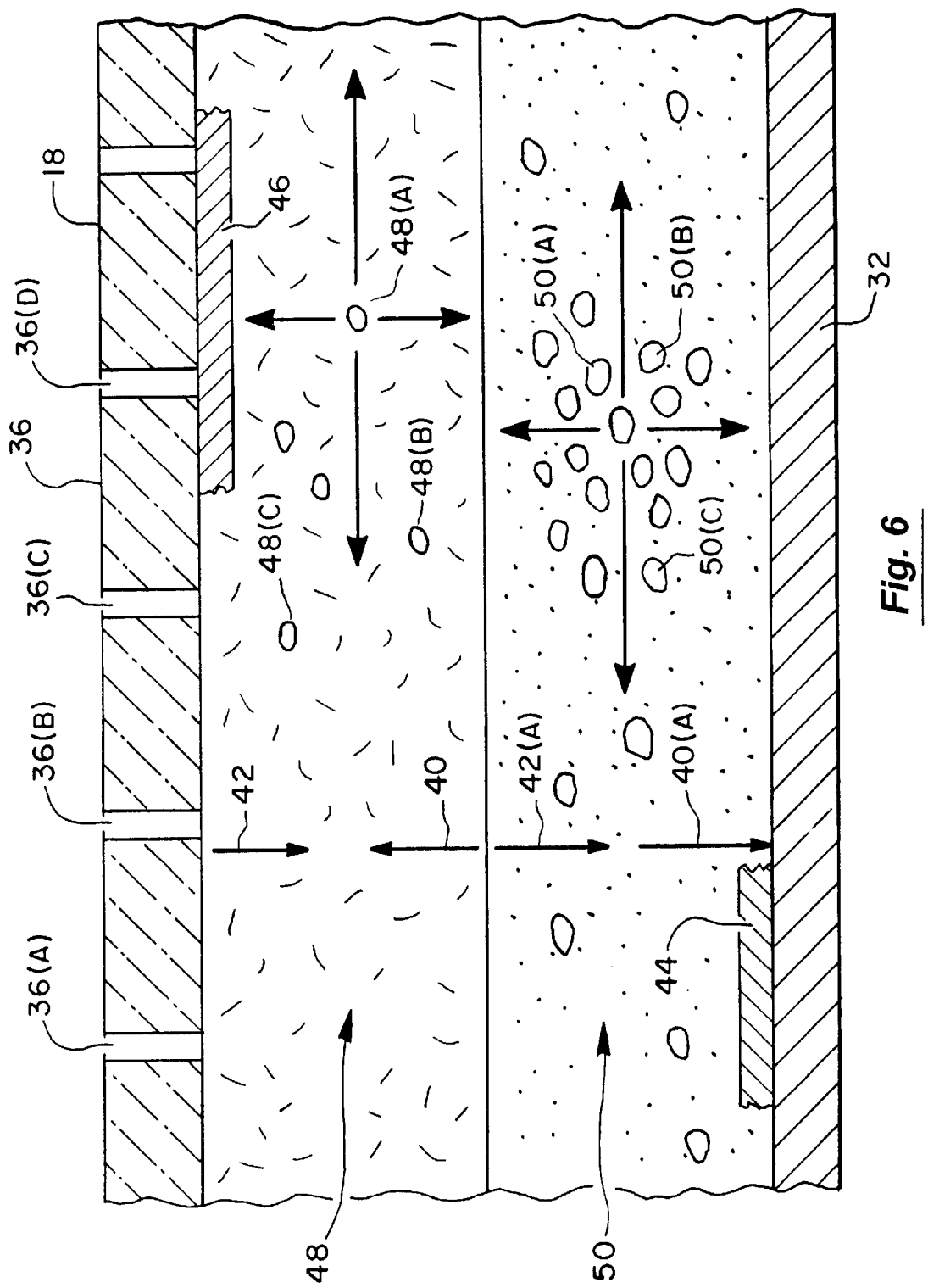
FIG. 6 shows a cross sectional detail of a DD/mounting cage/foam/enclosure system wherein an overall foam system is comprised of two distinct foam layers.

FIG. 6 depicts another foam layer system comprised of two distinct layers 48 and 50 of foam. These two sublayers can have the same, or different, physical thicknesses, and/or mechanical or chemical properties. For example, FIG. 6 shows foam layer 48 provided with an array of void spaces 48(A), 48(B), 48(C), etc. that are relatively smaller and relatively more sparsely distributed compared to the void spaces 50(A), 50(B), 50(C), etc. in foam layer 50. Again, layers of different foams can be combined to give an overall foam layer (foam layer 48 plus foam layer 50) desired overall damping, compliance, etc. characteristics. It also should be appreciated that 3, 4, 5, etc. layers of foam could be employed in such multiple ply foam layer systems.

Figure 7:
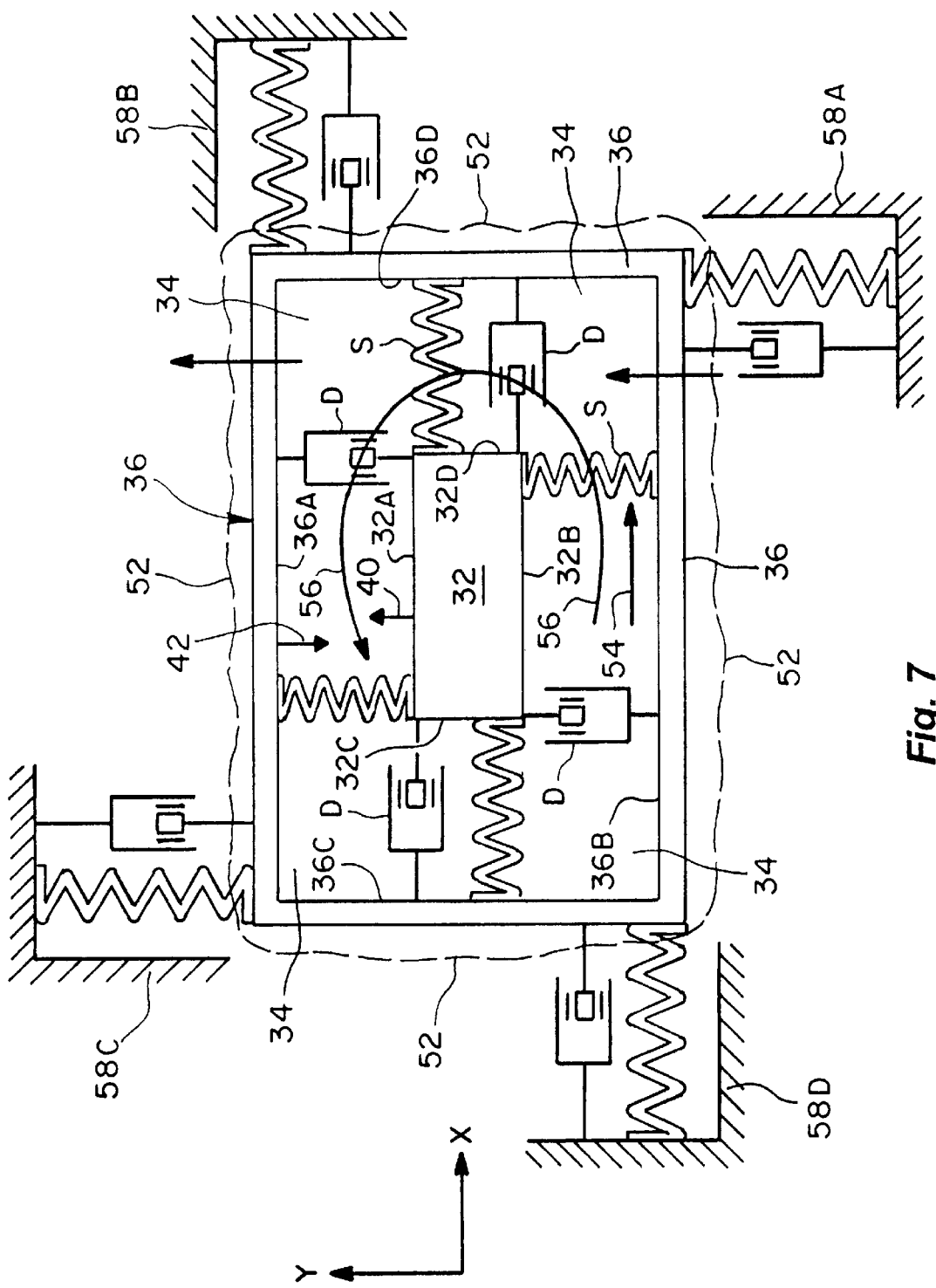
FIG. 7 is a conceptualized depiction of applicant's DD/mounting cage/foam/enclosure system/external housing system.

FIG. 7 depicts a conceptualization of this invention using the "spring and dashpot" symbols commonly used to depict the mechanical properties of viscoelastic materials such as foams. In this conceptualization, the DD array 22 shown in FIG. 2 can be regarded as having been placed in a mounting cage 30 to create the DD/mounting cage assembly 32 shown in FIG. 7. This DD/mounting cage assembly 32 can be thought of as being surrounded by a foam system 34 such as that shown in FIG. 3. Thus, the foam system 34 is positioned between the DD/mounting cage assembly 32 and the enclosure 36. The resulting system is conceptualized in FIG. 7 by placement of spring S and dashpot D symbols at each of the four corners of the DD/mounting cage assembly 32. It will be appreciated that this two dimensional (X-Y coordinate) presentation will apply just as well to three dimensional (X-Y-Z coordinate) systems. In any case, the foam layer system 34 depicted in FIG. 7 by the spring S and dashpot D symbols also can be regarded as being in a state of compression between the DD/mounting cage assembly 32 and the enclosure system 36. For example, a state of compression of the foam 34 between the inside of the top 36A of the enclosure system 36 and the outside of the top 32A of the DD/mounting cage assembly 32 is depicted by arrows 40 and 42—as it was in FIG. 5.

The foam 34 can be (but need not be) compressed between the bottom 32B of the DD/mounting cage assembly 32 and the inside of the bottom 36B of the enclosure system 36. Similar compressive forces could be experienced by the foam between the left side 36C of the enclosure system 36 and the left side 32C of the DD/mounting cage assembly 32. The same is true of the foam 34 between the right side 32D of the DD/mounting cage assembly 32 and the right side 36D of the enclosure system 36. And here again, a similar depiction could involve a depth dimension Z of this spring S and dashpot D system. Be that as it may, the resulting DD/mounting cage/foam/enclosure system shown in FIG. 7 is enclosed by a generalized dotted line encirclement 52. It is through use of this DD/mounting cage/foam/enclosure system (52) that the DD/mounting cage assembly 32 (and hence the individual DDs it contains) is protected against translational mechanical forces such as that depicted in FIG. 7 by linear arrow 54. It is also protected against rotational mechanical torques such as those depicted by curved arrow 56. Protection against self-induced rotational mechanical torques 56 is, however, especially achieved through the individual DDs being rigidly mounted to the mounting cage 30.

The encircled system (52) depicted in FIG. 7 is also shown mounted in an external housing. This mounting of the DD/mounting cage assembly/foam/enclosure system (shown generally encircled by dotted line 52) within the external housing can take place at various locations 58A, 58B, 58C, 58D, etc. on the RAID housing. This mounting can be by known mechanical fastener, connector, lock, etc. mounting means. In some of the more preferred embodiments of this invention, however, viscoelastic materials could be positioned between the external housing and the DD/mounting cage assembly/foam/enclosure system.

Figure 8:
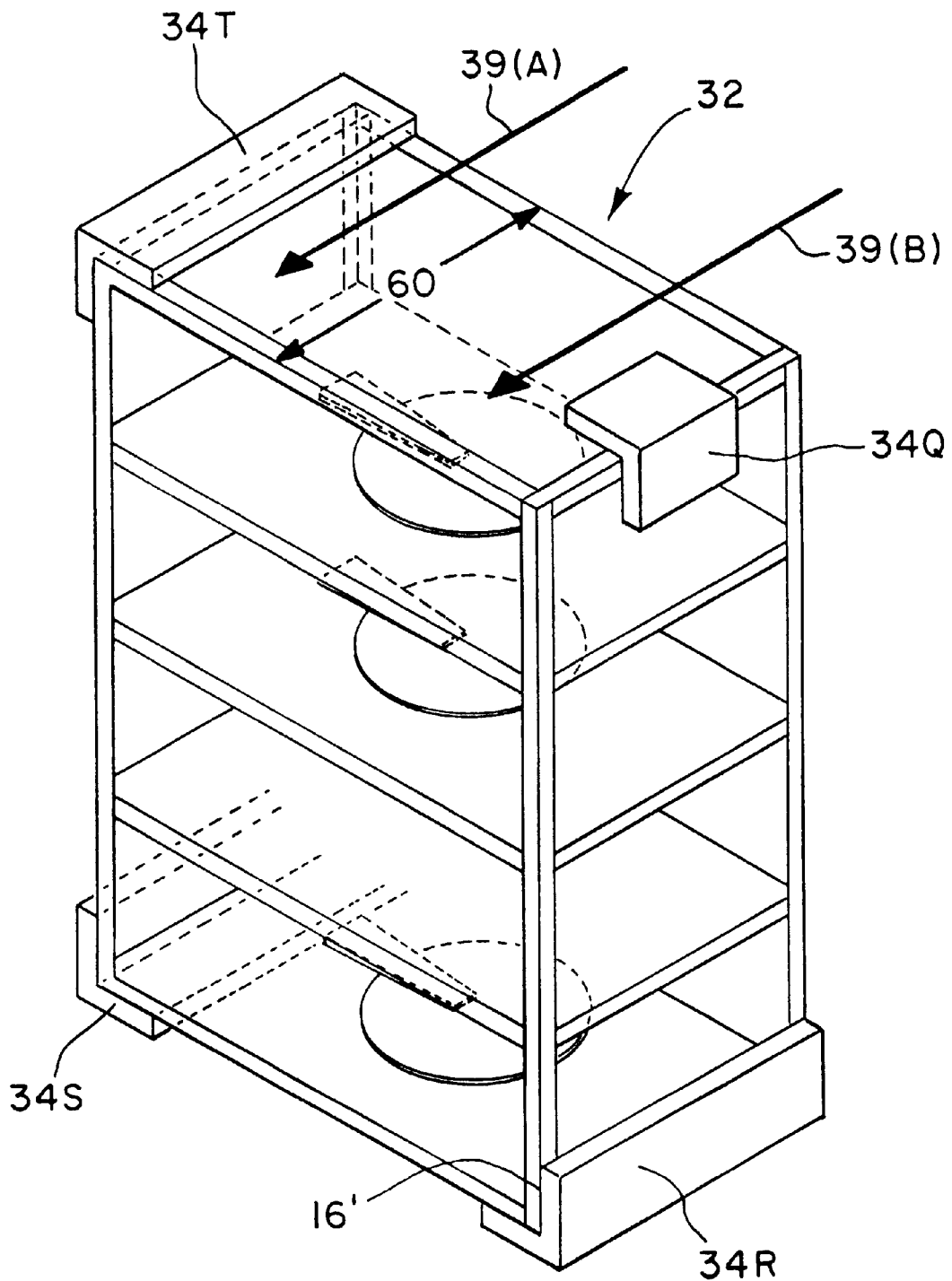
FIG. 8 is a perspective view of a DD/mounting cage/foam/enclosure system wherein the foam is comprised of an array of individual foam layers.
Figure 9:
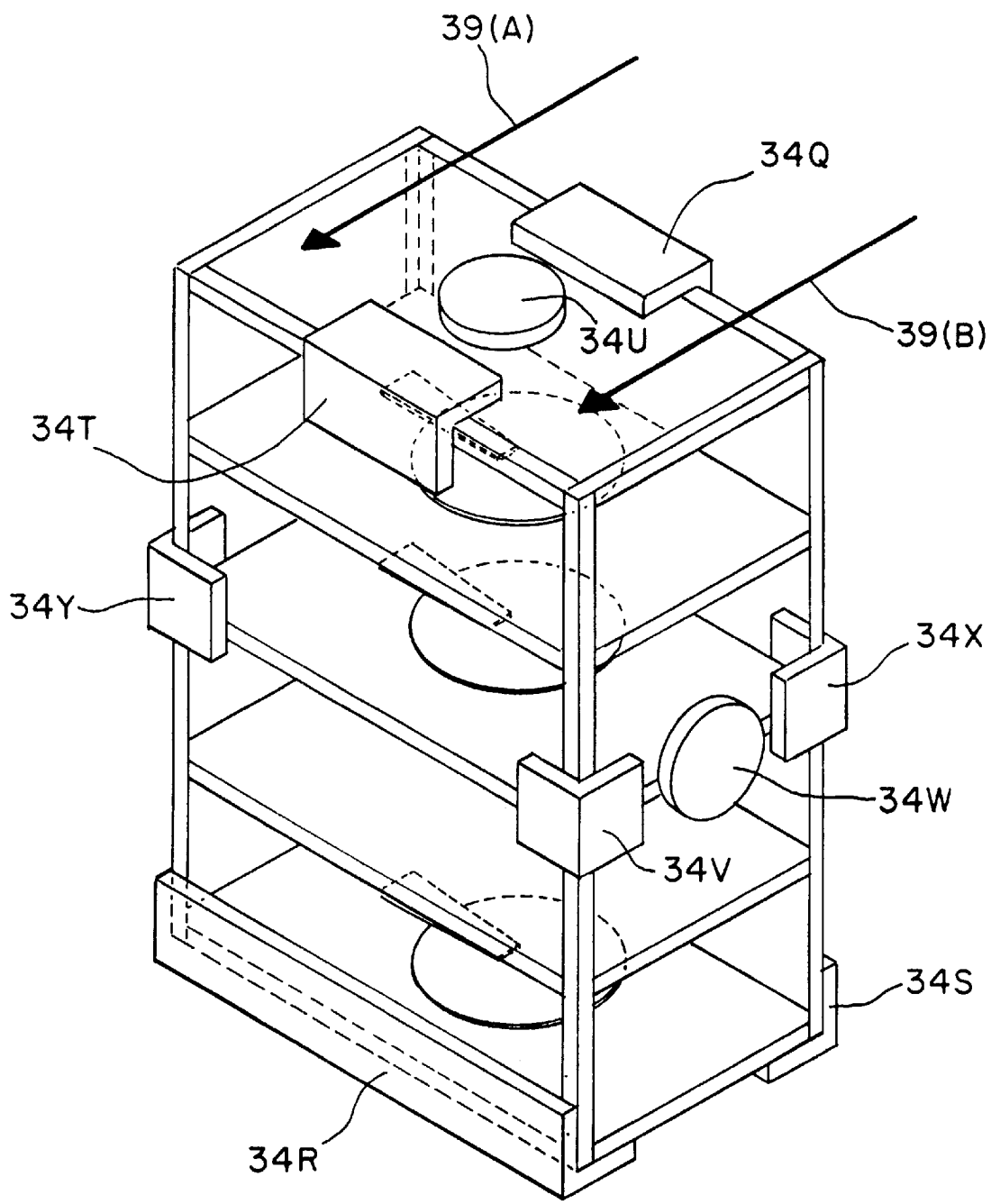
FIG. 9 is a perspective view of a DD/mounting cage/foam/enclosure system wherein the foam is comprised of another array of individual foam layers.

FIGS. 8 and 9 show foam enclosure systems that can be employed in the practice of this invention in various arrays of individual foam components. Such arrays may comprise foam materials separated by non-damping material(s) or open space(s). In addition, two or more layers of foam can be used at these various foam layer locations. Moreover, each of the two or more layers in these diverse foam layer locations may be the same (or different) foam composition. FIG. 8, for example, depicts a DD/mounting cage assembly 32 provided with L-shaped foam layers 34Q, 34R, 34S, and 34T at each of its four corners. Each of these L-shaped foam layers 34Q, 34R, 34S and 34T may have a length that is substantially equal to the width 60 of the DD/mounting cage assembly 32. These L-shaped layers also can be shorter or longer than the width of the DD/mounting cage assembly 32. In FIG. 8 for example, L-shaped layer 34Q is only about one half of the width 60 of the DD/mounting cage assembly 32. It is somewhat preferred, however, that each such foam layer will have a length that is from about 20 to 100 percent of an DD/mounting cage assembly side over which such a foam layer is placed. Moreover, each of these L-shaped layers 34Q, 34R, 34S and 34T may be made of two or more plies of a different kind of foam material. These different kinds of foam material also may have different lengths, widths and/or thicknesses. It also is to be understood that one or more of these foam layers 34Q, 34R, 34S or 34T can be in a state of compression between the DD/mounting cage assembly 32 and the enclosure system 36 that surrounds it. The direction arrows 39(A) and 39(B) shown in FIG. 8 are intended to suggest that the foam layer system 34 allows streams of air 39(A), 39(B), etc. to pass over the top of the DD/mounting cage assembly 32 since this is a particularly effective ventilation circumstance.

FIG. 9 shows another embodiment of this invention wherein foam layers 34Q through 34Y are distributed about the DD/mounting cage assembly 32. Here again, one or more of these foam layers may be in a state of compression between said DD/mounting cage assembly 32 and the enclosure system 36 that will surround them. FIG. 9 shows foam layers 34Q and 34T having lengths that are less that the length of the top of the DD/mounting cage assembly 32. Here again, this circumstance permits cooling streams of air 39(A), 39(B), etc. to pass over the top of the assembly 32 in order to more effectively cool the DDs it contains.

This invention also contemplates the use of chemically "tuned" foams to give desired damping, compliance and air porosity characteristics. Those skilled in the foam making arts will of course appreciate that foam materials can be chemically and/or compositionally designed to create void spaces of varying size and frequency between the beads of material that form the body of the foam material. The previously noted '281 patent, '642 patent and '787 patent all teach such chemically and/or compositionally tuned foams. For example, these patents teach that such void space-containing foams can be made from solid or hollow beads (including microbeads) of various resin materials. After heating these resins beads to their melting points, they become bonded together upon cooling of the melted resin materials. The end product foam materials of these patent disclosures are arrays of (1) thermally set resin elements that are interconnected and thereby serve to hold said resin in a cohesive body, (2) other, non-resin materials such as fibers and (3) void spaces.

The use of so-called "open-cell" foams may be preferred over the use of so-called "closed-cell" foams in the practice of this invention because open-cell foams are generally more compliant and have more and larger void spaces. Suitable foam materials for making compliant and air porous foams for the practice of this invention can be made from resin materials selected from the group consisting of polystyrene, polyethylene, polypropylene, polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Such resin materials are usually "cross-linked" by cross-linking agents to enhance their strength, mechanical compliance, void space volume and temperature integrity. Examples of useful crosslinking agents for the above noted resins include, but are not limited to, those selected from the group consisting of diacrylates, triacrylates, triazines, and the like.

Again, those skilled in the foam making arts also will appreciate that the compliance and damping characteristics of the foams used in the practice of this invention can be modified as desired by creating foams having more and/or larger voids in their bodies. Creating such voids in the foam material also increases the compliance of a foam (by lowering its stiffness) without having to use a different foam, which may imply too large of a change in a desired damping or compliance characteristic. For example, an increase in compliance can be achieved by the use of foams having greater void volumes because the surrounding foam material (that normally helps prevent a foam from buckling as it is compressed) is replaced by void spaces. Thus, the self support of the foam can be reduced by providing the foam with a greater void volume. Voids could also simply be cut in the foam. Again, the average size of individual voids, the total void volume and the proximity of the voids to one another are all factors that can be designed by use of different resin compositions in different proportions, under different temperature, time and pressure conditions at the time of the foam's manufacture. Again, these are all matters well within the skill of foam manufacturers.

In addition to the viscoelastic component of these resin-based foams, the end product foam materials also may include varying amounts of non-resin materials such as fibrous and/or particulate materials. The fibrous materials can be in the form of threads, cords, yarns, rovings, filaments, etc., as long as the foam's resin ingredients can wet the surface of the fiber material. The non-resin materials also can include (but not be limited to) metallic fibrous materials, such as aluminum oxide, magnesium, or steel fibers.

While applicant's invention has been described with respect to various theories, specific examples, and a spirit that is committed to the concept of placing foam between a DD/mounting cage assembly and an enclosure system in order to protect a DD array from mechanical disturbances, it is to be understood that this invention is not limited thereto, but rather only should be limited by the scope of the following claims.

We claim:

1. A disk drive enclosure system, comprising:
    an enclosure that remains associated with a plurality of disk drives during operation of said plurality of disk drives;
    a cage configured to mount said plurality of disk drives; and
    foam that remains between the cage and the enclosure during operation of the plurality of disk drives.

2. The disk drive enclosure system of claim 1 further comprising a plurality of disk drives mounted to the cage.

3. The disk drive enclosure system of claim 1 further comprising a RAID system mounted to the cage.

4. The disk drive enclosure system of claim 1 wherein the foam is placed in a state of compression between the cage and the enclosure.

5. The disk drive enclosure system of claim 1 wherein the foam is comprised of two or more distinct layers of foam.

6. The disk drive enclosure system of claim 1 wherein the foam is comprised of at least two physically separate pieces of foam.

7. The disk drive enclosure system of claim 1 wherein the foam is positioned on at least four sides of the cage.

8. The disk drive enclosure system of claim 1 wherein the foam is comprised of at least two physically separate foam pieces and wherein said at least two physically separate foam pieces are made from at least two compositionally different types of foam.

9. The disk drive enclosure system of claim 1 further comprising an external housing in which the disk drive enclosure system is mounted.

10. The disk drive enclosure system of claim 1 further comprising an external housing in which the disk drive enclosure system is mounted and wherein foam is placed between the enclosure system and the external housing.

11. A disk drive enclosure system, comprising:
    an enclosure that remains associated with a plurality of disk drives during operation of said disk drives;
    a cage configured to rigidly mount said plurality of disk drives to said cage; and
    foam that remains between the cage and the enclosure during operation of the plurality of disk drives.

12. The disk drive enclosure system of claim 11 further comprising a plurality of disk drives rigidly mounted to the cage.

13. The disk drive enclosure system of claim 11 further comprising a RAID system rigidly mounted to the cage.

14. The disk drive enclosure system of claim 11 wherein the foam is placed in a state of compression between the cage and the enclosure.

15. The disk drive enclosure system of claim 11 wherein the foam is comprised of two or more distinct layers of foam.

16. The disk drive enclosure system of claim 11 wherein the foam is comprised of at least two physically separate pieces of foam.

17. The disk drive enclosure system of claim 11 wherein the foam is positioned on at least four sides of the cage.

18. The disk drive enclosure system of claim 11 wherein the foam is comprised of at least two physically separate foam pieces and wherein said at least two physically separate foam pieces are made from at least two compositionally different types of foam.

19. The disk drive enclosure system of claim 11 further comprising an external housing in which the disk drive enclosure system is mounted.

20. A RAID enclosure system, comprising:
    an enclosure that remains associated with a RAID system during operation of said RAID system;
    a cage having said RAID system rigidly mounted to said cage; and
    at least one layer of foam that remains between the cage and the enclosure during operation of the plurality of disk drives.

* * * * *

(12) EX PARTE REEXAMINATION CERTIFICATE (6737th)

United States Patent
Ives et al.

(10) Number: US 6,567,266 C1
(45) Certificate Issued: Mar. 31, 2009

(54) FOAM SYSTEMS FOR PROTECTING DISK DRIVES FROM MECHANICAL DISTURBANCES

(75) Inventors: Thomas W Ives, Boise, ID (US);
Donald P Roehling, Eagle, ID (US)

(73) Assignee: Hewlett-Packard Development Company, L.P., Houston, TX (US)

Reexamination Request:
No. 90/007,397, Jan. 27, 2005

Reexamination Certificate for:
Patent No.: 6,567,266
Issued: May 20, 2003
Appl. No.: 09/859,850
Filed: May 16, 2001

(51) Int. Cl.
*G11B 33/12* (2006.01)
*G11B 33/08* (2006.01)

(52) U.S. Cl. .................. 361/685; 361/679; 361/683
(58) Field of Classification Search .................. 181/284; 369/80; 361/685
See application file for complete search history.

(56) References Cited

U.S. PATENT DOCUMENTS

| | | | | |
|---|---|---|---|---|
| 5,596,483 A | * | 1/1997 | Wyler | 361/683 |
| 5,858,509 A | * | 1/1999 | Polch et al. | 428/166 |
| 6,018,456 A | * | 1/2000 | Young et al. | 361/684 |
| 6,242,691 B1 | | 6/2001 | Reese | |
| 6,466,449 B1 | * | 10/2002 | Sheen et al. | 361/752 |
| 6,674,609 B2 | * | 1/2004 | Boutaghou | 360/97.02 |
| 2003/0090871 A1 | | 5/2003 | Hein | |

OTHER PUBLICATIONS

Merriam–Webster's Collegiate Dictionary, tenth edition, pp. 160 and 1140.*

* cited by examiner

*Primary Examiner*—Anjan K. Deb

(57) ABSTRACT

A disk drive array can be protected from mechanical disturbances by foam positioned between a disk drive/mounting cage assembly and an enclosure system. In some of the more preferred embodiments of this invention the individual disk drives will be rigidly mounted to their mounting cage.

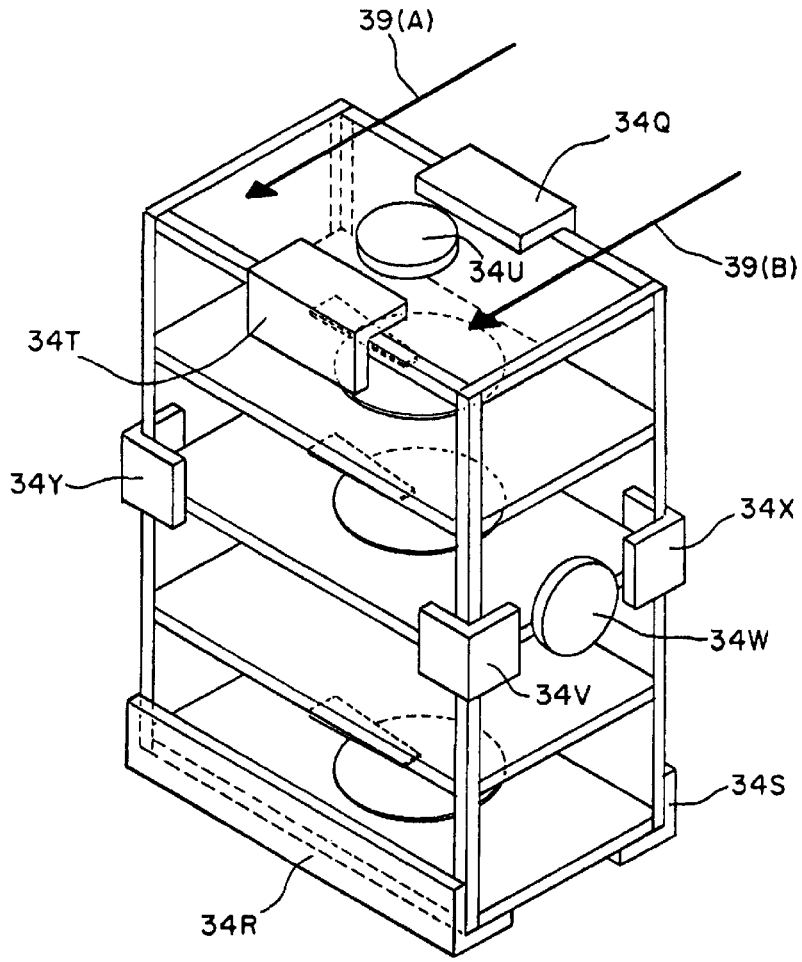

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 9, 10 and 19 is confirmed.

Claims 1–8, 11–18 and 20 are cancelled.

\* \* \* \* \*